Feb. 26, 1963   I. T. SALDI   3,079,515
ENERGY CONVERSION DEVICE AND METHODS OF MAKING
Filed Aug. 22, 1960   3 Sheets-Sheet 1
FIG. I.
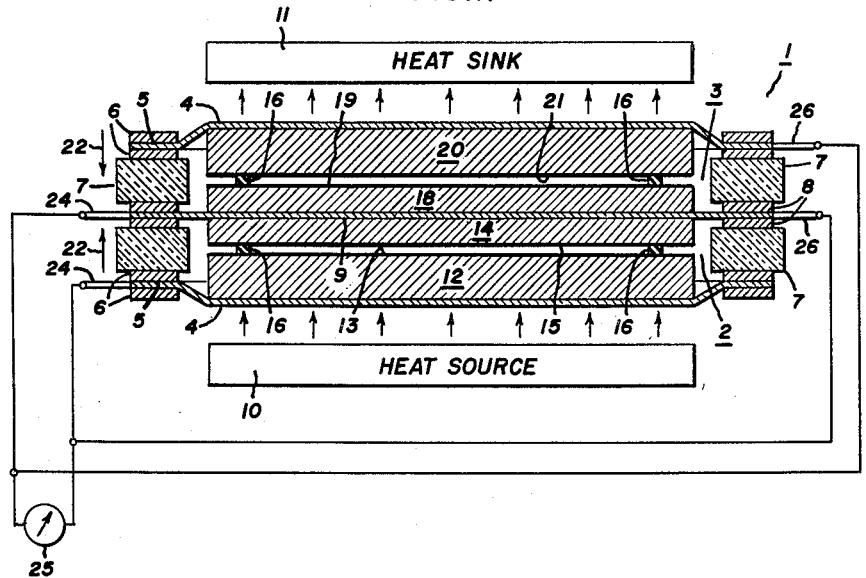
FIG. 3.
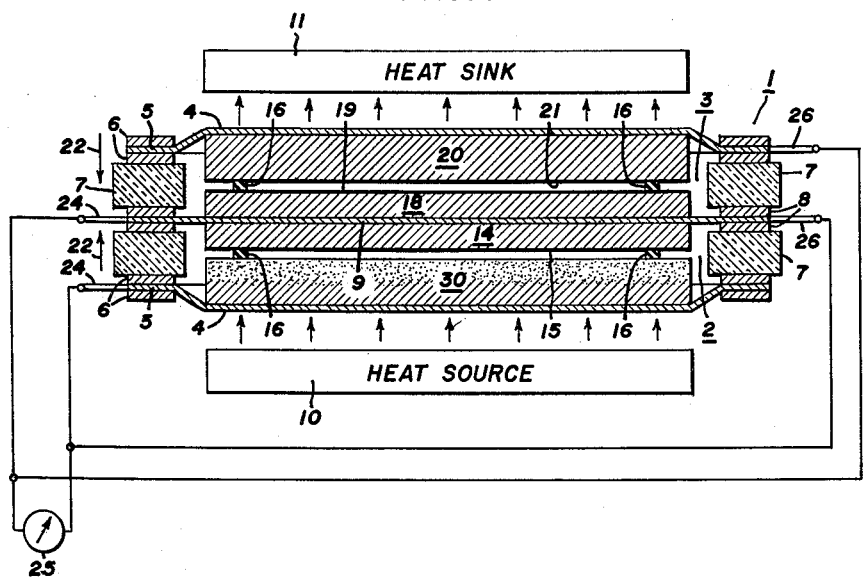
FIG. 2.
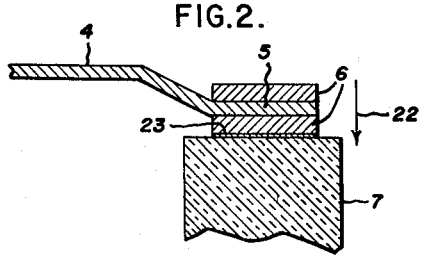
INVENTOR:
IDEAL T. SALDI,
BY Philip J. Schlaus
HIS ATTORNEY.

Feb. 26, 1963

I. T. SALDI 3,079,515

ENERGY CONVERSION DEVICE AND METHODS OF MAKING

Filed Aug. 22, 1960

INVENTOR:
IDEAL T. SALDI,
BY *Philip L. Schlamp*
HIS ATTORNEY.

INVENTOR:
IDEAL T. SALDI,
BY Philip L. Schlamp
HIS ATTORNEY.

3,079,515
Patented Feb. 26, 1963

3,079,515
ENERGY CONVERSION DEVICE AND METHODS OF MAKING
Ideal T. Saldi, Ballston Lake, N.Y., assignor to General Electric Company, a corporation of New York
Filed Aug. 22, 1960, Ser. No. 51,063
18 Claims. (Cl. 310—4)

My invention relates generally to electric discharge devices and pertains more particularly to new and improved heat-to-electrical energy conversion devices and to new and improved means and methods for manufacturing same.

Heretofore, various types of devices have been provided for converting heat energy directly to electrical energy. However, most prior art devices are subject to substantial heat losses and resultant low thermal efficiency. Additionally, many energy conversion devices require substantially close, stable interelectrode spacing and difficulties have been encountered in maintaining such spacing, especially when the devices are required to operate in substantially reduced external pressure environments. Further, means heretofore provided for coping with these difficulties have tended to complicate manufacture and to add substantially to the size and weight per cm.$^2$ of the cathode area.

Accordingly, a primary object of my invention is to provide new and improved electric discharge devices of the heat-to-electrical energy type and adapted for operating with increased thermal efficiency.

Another object of my invention is to provide new and improved heat-to-electrical energy converters adapted for utilizing in the production of electricity the heat previously lost through the anode of the device.

Another object of my invention is to provide a new and improved envelope structure particularly adapted for use in manufacturing heat-to-electrical energy converter devices and effective for maintaining stable predetermined desired electrode arrangements and close interelectrode spacings therein.

Another object of my invention is to provide new and improved means and methods for simply insuring predetermined close interelectrode spacings of electrodes in electric discharge devices regardless of relative differences of internal and external atmospheric conditions, or the magnitude of stresses established during manufacture of the component parts of the devices.

Another object of my invention is to provide new and improved means and methods of manufacturing heat-to-electrical energy conversion devices.

Further objects and advantages of my invention will become apparent as the following description proceeds and the features of novelty which characterize my invention will be pointed out with particularity in the claims annexed to and forming part of this specification.

In carrying out the objects of my invention I provide structure including an envelope containing at least first and second stage conversion devices, each comprising cathode and anode elements with the anode of the first stage device and cathode of the second stage device being conjoined in direct heat-transferring relation, whereby heat losses through the anode of the first stage devices are effective for energizing the cathode of the other device. In my invention the work functions of the active surfaces of the anodes are lower than the work functions of the active surfaces of the cooperating cathodes and the work function of the active surface of the cathode of the second stage device is lower than the work function of the active surface of the first stage device cathode. In one particular form of my invention the opposed active surfaces of the first stage device can be coated with electron emissive oxide materials with the emissive material on the anode having a lower work function than that on the cathode; and the electrodes of the second stage device can be coated with an electron emissive material having substantially the same work function as that on the anode of the first device. In another form of my invention the cathode of the first stage device can be a prepared cathode of the dispenser type. In still another form of my invention the first stage device can include an alkali-metal vapor atmosphere and refractory metal electrodes. In this form the second stage device can be evacuated and can include a prepared cathode of the dispenser or oxide coated types. Alternatively, the second stage device in this form of my invention can contain an alkali-metal vapor atmosphere and, if desired, can include a dispenser type cathode. In all forms of my invention the envelope can include end caps which are adapted for minimal heat losses therethrough and are prestressed to provide internal forces tending to urge the opposed electrode surfaces toward each other and into contact with interposed precisely accurately dimensioned space-determining elements. The mentioned prestressing is effectively obtained through a novel method of manufacturing. Additionally, means can be provided for extending into the envelope and holding the conjoined anode and cathode of adjacent devices in predetermined positions relative to the electrodes cooperating therewith. The last mentioned means can serve as a hermetically-sealed partition or divider separating the atmospheres of adjacent devices and can be adapted for minimal heat losses therethrough.

For a better understanding of my invention reference may be had to the accompanying drawing in which:

FIGURE 1 is an enlarged sectional view illustrating a heat-to-electrical energy conversion system incorporating a form of my improved converter structure, and wherein the active surfaces of all the electrodes bear emissive oxide coatings;

FIGURE 2 is an enlarged fragmentary sectional view illustrating the prestressed envelope feature of my invention;

FIGURE 3 is an enlarged sectional view of a modified form of my invention, wherein the cathode of the first stage device is of the dispenser type;

Figure 6:
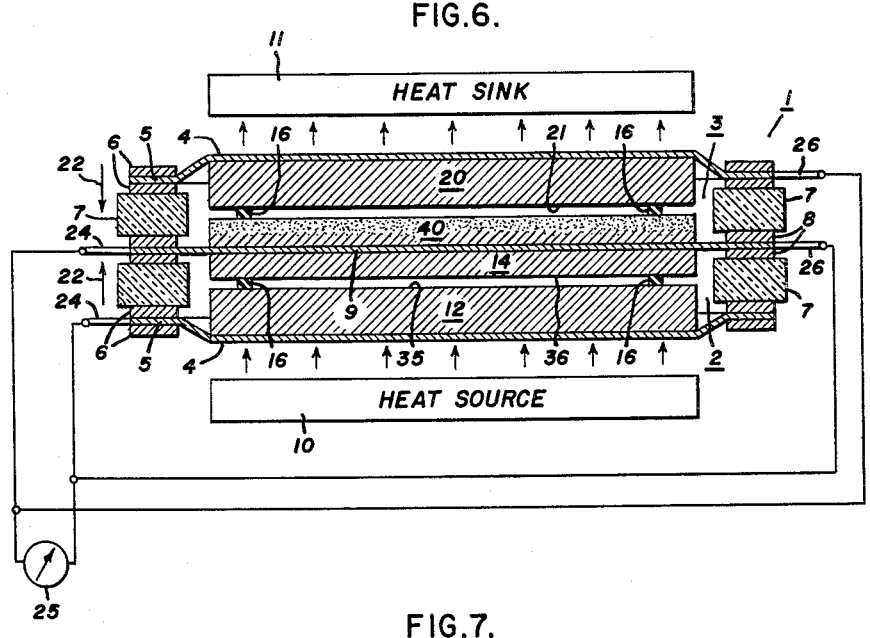
Figure 7:
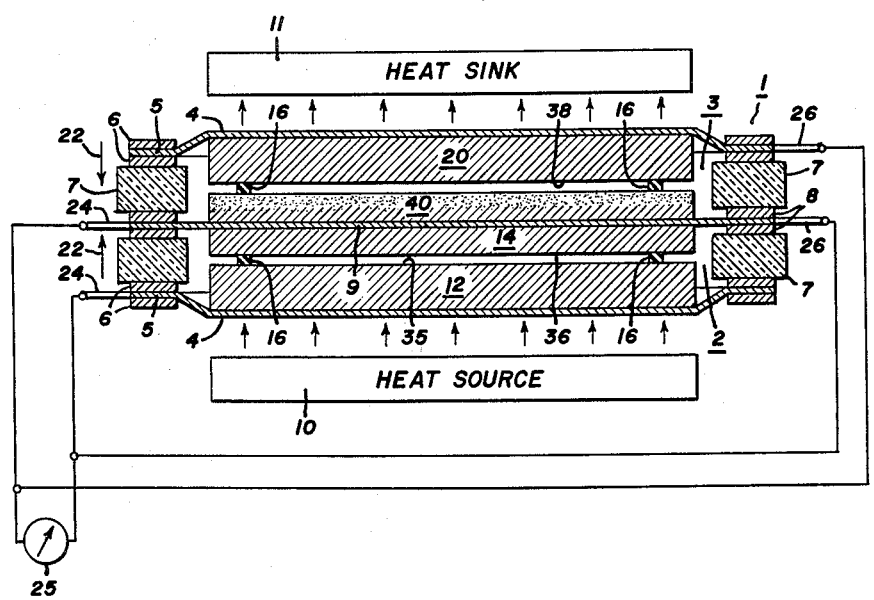

FIGURE 6 is an enlarged sectionalized view of another form of my invention, wherein the first stage device is of the alkali-vapor type, and the second stage device is of the vacuum type and includes a dispenser type cathode; and FIGURE 7 is an enlarged sectionalized view of still another form of my invention, wherein both stages are of the alkali-vapor type and the cathode of the second stage is of the dispenser type.

Referring to FIGURE 1, I have shown a thermionic converter system constructed in accordance with one embodiment of my invention and including an envelope structure generally designated 1. In the embodiment illustrated, the envelope 1 contains two cooperating or cascaded heat-to-electrical energy conversion devices of the thermionic converter type generally designated 2 and 3. However, it is to be understood from the outset that my invention can comprise any number of cooperating converter devices and is not limited to the employment of only two, nor is my invention limited to converters of the thermionic type.

The envelope 1 comprises a pair of opposed shallow cup-shaped end caps 4 bonded to an intermediate envelope wall section comprising a stacked array of ceramic and metal washers. In describing the envelope structure identical numerals will be used to designate identical elements even though, as in the case of the end caps 4, the elements may be oppositely disposed or mirror images of other elements in the arrangement.

Each end cap 4 is preferably formed of platinum-rhodium foil having a thickness of approximately 0.002 inch and is slightly depressed centrally to provide a flat washer-like rim 5 which is suitably hermetically bonded, as by brazing, between a pair of metal washers 6, each of which washers can advantageously be formed of titanium metal. The inner washer 6 is bonded by a suitable vacuum-tight ceramic-to-metal seal to one transverse surface of a ceramic annulus or washer-like element 7 which can advantageously be formed of forsterite ceramic. The opposite transverse surface of each of the ceramic washers 7 is bonded by a suitable vacuum-tight ceramic-to-metal seal to a surface of a washer 8 which can also be advantageously formed of titanium. Interposed and hermetically sealed between the opposed surfaces of the washers 8 is the rim of a highly refractory metal foil disk 9 which can be advantageously formed of tantalum, molybdenum or tungsten sheet having a thickness of approximately 0.005 inch. Details regarding the functions of the disk 9 will be set forth hereinafter.

Contained in the envelope 1 are a plurality of heat-to-electrical energy conversion devices of the thermionic type. These devices are thermally staged or cascaded to enable operation of the first stage by heat originating from a source in the system designated 10 while the second stage device 3 is adapted for operating on heat losses from the first stage device. Additionally, the second stage device can be associated with a heat sink designated 11 which is adapted for maintaining an appropriate temperature gradient across the device. A gradient is required to provide for a contact potential difference between cathode and anode.

The first stage device 2 comprises a refractory metal cathode member 12 which preferably is in the form of a disk of tungsten and is suitably bonded in direct heat-transferring relation by a metal-to-metal bond to the inner surface of the lower one of the end caps 4, as viewed in FIGURE 1. The tungsten disk 12 includes a planar active surface comprising an emissive oxide coating 13 which is preferably strontium-calcium oxide (SrCa)O.

Cooperating with the cathode member 12 in the first stage device is a refractory anode member 14 which is also preferably in the form of a disk of tungsten. The anode member 14 includes a planar active surface comprising an emissive oxide coating 15 which preferably is barium-strontium oxide (BaSr)O, and which has a lower work function from the electron emissivity standpoint than the (SrCa)O coating on the cathode member 12. The cathode and anode members 12 and 14, respectively, are maintained predeterminedly spaced by a plurality of interposed insulative spacer elements 16 which are precisely accurately dimensioned for maintaining an interelectrode spacing of approximately 0.0005 inch between the oxide coatings on the cathode and anode when the members are held tightly against the spacer members. The feature of providing (SrCa)O and (BaSr)O coatings on the cathode and anode is not my invention but is disclosed and claimed in application Serial No. 25,098 of Martin D. Gibbons, entitled "Compatible Electrode System in Vacuum Thermionic Apparatus," filed April 27, 1960, and assigned to the same assignee as the present invention.

The anode member 14 is bonded by a suitable metal-to-metal conductive bond to one surface of the tantalum foil disk 9. This arrangement provides for holding the anode member 14 centrally in the envelope in cooperating relation with respect to the cathode member 12.

Bonded by a suitable heat-conducting metal-to-metal bond to the surface of the foil disk 9 opposite the anode member 14 is the cathode member 18 of the second stage device 3. The cathode member 18 is also formed as a disk of a refractory metal and can also advantageously be of tungsten. The cathode member 18 constitutes a heat sink in relation to the anode 14, and, additionally, includes an active surface bearing an electron emissive coating 19 of barium-strontium oxide (BaSr)O.

Cooperating with the cathode is an anode member 20 which can also be formed advantageously as a disk of tungsten. The anode member 20 includes a planar active surface bearing an emissive oxide coating 21 of (BaSr)O. The anode 20 is bonded, as by brazing, to the inner surface of the upper end cap 4 and the oxide-coated surfaces of the cathode 18 and anode 20 are maintained predeterminedly closely spaced and preferably approximately 0.0005 inch by precisely accurately dimensioned refractory insulative spacers 16 interposed therebetween.

In order to insure the predetermined spacing between the cathode and anode members of each converter device my structure includes means for urging and maintaining the cathode and anode members into contact with the respective mentioned precisely accurately dimensioned spacers 16. Specifically, the walls of the envelope of my structure are prestressed to provide during normal operation inwardly directed forces indicated by the arrows 22 in FIGURES 1 and 2 and effective for urging the cathode of the first stage device and the anode of the second stage device inwardly against the spacers 16.

I can establish the mentioned prestressing in the envelope during final sealing thereof. First, I preassemble by stacking and sealing the intermediate portions of the structure including all of the elements other than the end caps, the cathode 12, the anode 20 and the rings 6, thereby to provide a main subassembly. The cathode 12 and anode 20 are then bonded to the respective end caps as are the rings 6 to provide end cap subassemblies. Then the emissive coatings are applied to the electrodes, the spacers 16 are placed in position between the electrodes and brazing material, indicated by the darkened line 23 in FIGURE 2, is inserted between each of the ceramic insulators 7 and the inner ones of rings 6 on the end cap subassemblies. The insertion of the spacers between the cathodes and anodes, the application of the oxide coatings to the cathodes and anodes and the insertion of the brazing material between the ceramic insulators and rings all result in a gap of approximately 0.0002 and 0.0004 inch at the final braze area of the envelope parts. Subsequently, the stacked converter assembly is brought to a final brazing temperature in a vacuum by any suitable means at which time the envelope is evacuated and the elements between the end caps expand thermally to close the mentioned gap and effect seals between the main subassembly and the end cap subassemblies. Subsequently, upon cooling and after sealing, the thermally expanded envelope elements endeavor to contract and thereby results the establishment of the desired internal stresses in the envelope.

The prestressing of the envelope is effective for insuring dimensional stability under various operating conditions or preventing undesirable separation of the electrodes when the structure is required to operate under reduced external atmospheric conditions. Additionally, the prestressing is effective for serving as a counterbalancing force to offset adverse effects on the interelectrode spacing that could result from the release of internal mechanical stresses developing during the manufacture and assembly of the end caps. Further, the cup-shaped configuration of the end caps, including the sloping side portions, and the relatively thin foil construction of the end caps serve to provide the required mechanical strength while also being adapted for absorbing any stresses in the radial direction of the device which may result from mismatch in thermal expansion of the various materials during the assembly process.

In the operation of the above-described system heat is supplied to the cathode 12 of the first stage device 2 from the external heat source 10 which can be of any desired type adapted for affording heat in an amount of approximately 1,000 to 2,000° K. Additionally, the heat sink has sufficient capacity to provide for operation of the anode of the first stage at a temperature of approximately 300° K. below that of the cathode. The oxide coating 13 is rendered emissive by the heat source and the electrons emitted from the active surface of the cathode tend to migrate toward the anode 14. The oxide coating 15 on the anode 14 has a lower work function and thus attracts the electrons emitted from the cathode coating for creating a current flow across the interelectrode gap. External leads 24 electrically connected to the cathode 12 and the anode 14 of the first stage device 2 on one side of the converter structure provide for a current path through an external load such as a meter generally designated 25.

With an interelectrode spacing of approximately 0.0005 inch and with the above-noted oxide coatings on the electrodes of the first stage device 2 it is possible to obtain currents of approximately 10 amps./cm.$^2$ at 1400° K. of the cathode. However, without my invention substantial heat, and as much as 90% of the heat input, would be lost through the anode 14 and, thus, would be reduced substantially the thermal efficiency of the device. In my improved device the heat which would otherwise be lost is effectively utilized for operating the second stage device 3 and, thus, adding appreciably to the overall thermal efficiency of the converting system.

As described above, in my device the cathode 18 of the second stage 4 is in high heat-transferring relation with respect to the anode 14 of the first stage device 2. Thus, the cathode 18 is adapted for being heated by the heat emanating from the anode 14 of the first stage device 2. This heat is effectively employed for rendering the lower work function (BaSr)O coating on the cathode 18 emissive for causing a current flow across the second stage device in substantially the same manner as described above in connection with the first stage device. Leads 26 provided on the right hand side of the structure are effective for conducting this current from the second stage device and are connected with the circuit of the first stage device, thereby to increase the thermal efficiency of the overall structure. With interelectrode spacing of approximately 0.00066 inch which can be obtained and maintained by means of the inwardly directed forces resulting from the mentioned prestressing of the envelope wall structure, I have been able to obtain from the second stage device currents of approximately 5 amps./cm.$^2$ at about 1100° K. for increasing the overall thermal efficiency of the system by about twice the original value.

Illustrated in FIGURE 3 is a modified form of my device in which the structure can be identical to that of FIGURE 1 except for the substitution of a dispenser type cathode designated 30 for the oxide coated cathode of FIGURE 1. The dispenser cathode 30 can be better adapted for association with a high heat source and thus can be relied upon for affording increased life. In this embodiment also the emissive materials of the cathodes are selected such that the cathode of the second stage device has a lower work function than that of the first stage device and the anodes each have lower work functions than their respective cathodes.

In the structures of FIGURES 1 and 2 the envelopes are completely evacuated and there is no need for utilizing the foil disk 9 as a hermetic divider. In fact, in these embodiments the disk 9 can be perforate or can comprise any means effective for extending into the envelope and holding the conjoined anode and cathode members in desired position. Additionally, the member 9 can be formed of a gettering material, such, for example as tantalum and thus can serve effectively in the structure as means for maintaining the vacuum.

Figure 4:
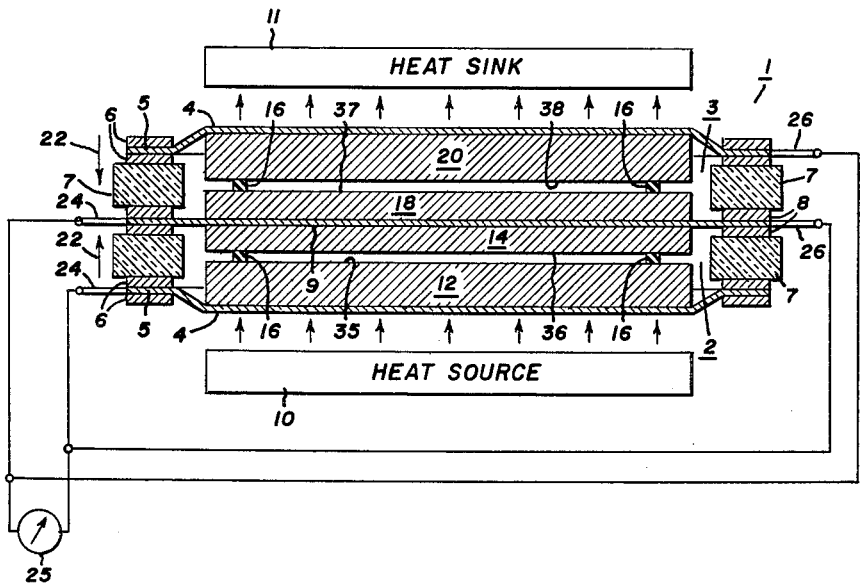
FIGURE 4 is an enlarged sectional view of another form of my invention, wherein both stages are of the alkali-vapor type.

Illustrated in FIGURE 4 is a modified form of my invention which can be identical to the first-described embodiment shown in FIGURE 1 except in that the cathode and anode members of both first stages are free of any emissive oxide coatings. Additionally, in this embodiment both stages include a low ionization potential vapor atmosphere and the disk 9 hermetically separates the atmosphere of the first stage device from that of the second stage device. Still further, in this embodiment there are provided means (not shown) for maintaining the ionizable vapor pressures at predetermined desired operating levels. The feature of maintaining an ionizable vapor atmosphere of an individual thermionic converter at a predetermined level effective for enhancing power output of the converter does not constitute part of my invention but is disclosed and claimed in the copending U.S. application Serial No. 698,552 of Volney C. Wilson, filed November 25, 1957, and assigned to the same assignee as the present invention.

In the embodiment of FIGURE 4 the atmosphere of the first stage device can advantageously comprise an alkali metal vapor, preferably cesium and within a predetermined pressure range which can be approximately $10^{-5}$ mm. to 20 mm. Hg. Thus, the active surface of the cathode designated 35 comprises cesiated refractory metal. The active surface 36 of the anode also comprises cesiated material such as either silver, copper or nickel coated with cesium, and the work function thereof is rendered relatively lower than that of the cathode by the condensation thereon of at least a monolayer of the alkali metal. In this embodiment also the heat input from the external source 10 is first effective for creating a current flow across the first stage device and the cathode of the second stage device is energized by heat which would otherwise be lost through the anode of the first stage device. The second stage device of the embodiment in FIGURE 4 can be similar to the first stage by including a cesiated refractory metal active surface 37 on the cathode and a cesiated metal active surface 38 bearing at least a monolayer of cesium on the anode. However, means (not shown) is provided for maintaining cesium vapor pressures in the device such that the work function of the cathode in the first stage device is higher than that of the cathode of the second stage device. Additionally, the vapor pressures are such that the work function of the cathode of the second stage device is lower than that of the cathode of the first stage device; and, thus, is adapted for being rendered emissive at lower temperatures than the cathode of the first stage device. Consequently, current flow across the second stage device is effected through the agency of the heat emanating from the anode of the first stage device, which adds to the current flow of the first stage device, thereby to provide an overall structure of improved thermal efficiency.

Figure 5:
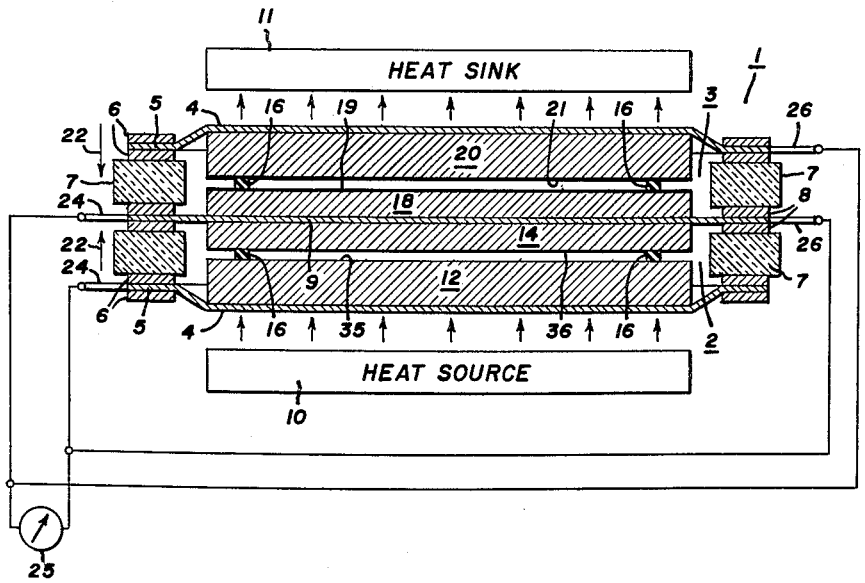
FIGURE 5 is an enlarged sectional view of another form of my invention, wherein the first stage device is of the alkali vapor type and the second stage device is of the vacuum type.

Illustrated in FIGURE 5 is a modified form of my invention in which the first stage can be identical to the first stage of the structure of FIGURE 4, including the cesiated metal active surfaces 35 and 36, and the second stage device can be identical to the second stage of the structure of FIGURE 1, including the emissive oxide coatings 19 and 21. In this embodiment, also, the materials of the cathode of the second stage device is selected in order to provide a cathode having a work function lower than that of the cathode of the first stage device.

Illustrated in FIGURE 6 is another modified form of my invention which can be identical to the structure of FIGURE 5 except in that the cathode of the second stage device, instead of being oxide-coated, is of the impregnated or dispenser type. In this embodiment the dispenser type cathode of the second stage device is designated 40 and is adapted for making maximum utilization of the heat emanating from the anode 14 of the first stage device.

In this embodiment also the work function of the second stage cathode is preferably lower than that of the first stage cathode and the combination of devices is effective for increasing the thermal efficiency of the overall structure.

In FIGURE 7 is illustrated a form of my invention which can be identical to that of FIGURE 4 except for the second stage cathode. In this embodiment the second stage cathode is designated 40 and is of the dispenser type. This cathode is, however, selected to be able to withstand the alkali vapor atmosphere and also to provide the required work function which must be lower than that of the active surface 35 of the first stage and higher than that of the second stage anode surface 38.

It is to be understood from the foregoing that my invention is particularly effective for increasing thermal efficiencies of heat-to-electrical energy devices. Additionally, my structure accomplishes increased efficiency in a manner which introduces no new manufacturing problems and without adding appreciably to the size and weight of the overall structure.

It is to be understood further that certain features of my invention are applicable to other than thermionic converters and that my invention is not limited to planar structures but has application to structures of the configurations such, for example, as those having concentrically arranged electrodes.

While I have shown and described specific embodiments of my invention I do not desire my invention to be limited to the particular forms shown and described and I intend by the appended claims to cover all modifications within the spirit and scope of my invention.

What I claim as new and desire to secure by Letters Patent of the United States is:

1. A heat-to-electrical energy converter comprising at least first and second stage devices in cascaded arrangement, said devices being hermetically sealed in enclosing means and each comprising a cathode and anode having closely spaced active surfaces with the active surface of said cathode being adapted for electron emission upon heating, the cathode of the first stage device being at a heat input region of said converter for being rendered emissive by heat entering said device at said input region, the anode of the first stage device constituting a heat sink and being in direct heat-transferring relation with the cathode of the second stage device, whereby said cathode of said second stage device is adapted for being rendered emissive by heat emanating from said anode of said first stage device, and the active surface of the cathode of said second stage device having a lower work function and thereby adapted for being rendered emissive at a lower operating temperature than that of said cathode of said first stage device.

2. A thermionic converter comprising at least first and second stage thermionic converter devices in cascaded arrangement, said devices being hermetically sealed and each including a cooperating cathode and anode having closely spaced oxide-coated active surfaces, the cathode of the first stage device being adapted for being rendered emissive by heat from an external heat source, the anode of said first stage device being in direct heat transferring relation with the cathode of said second stage device, whereby said cathode of said second stage device is adapted for being rendered emissive by heat emanating from said anode of said first stage device, and the work function of the cathode of said second stage device being lower than that of said cathode of said first stage device.

3. A thermionic converter according to claim 2, wherein the active surfaces of the cathode and anode of the first stage device comprise (CaSr)O and (BaSr)O, respectively, and the active surfaces of the cathode and anode of the second stage device each comprise (BaSr)O.

4. A heat-to-electrical converter structure comprising at least first and second stage thermionic converter devices, said devices being mutually hermetically sealed, said first stage device comprising refractory metal cathode and anode members having opposed closely spaced cooperating active surfaces and a low ionization potential vapor internal atmosphere, the cathode of said first stage device being adapted for being heated from an external heat source for having the active surface thereof rendered emissive, said second stage device being evacuated and comprising refractory metal cathode and anode members having opposed closely spaced emissive oxide active surfaces, and the anode of said first stage device being conjoined in back-to-back, heat-transferring relation to the cathode of said second stage device and thus adapted for being rendered emissive by heat emanating from the anode of said first stage device.

5. A heat-to-electrical energy converting structure according to claim 4, wherein the electrode members are of refractory metal, the internal atmosphere of said first stage device is an alkali metal vapor, and the active surfaces of said cathode and anode of said second stage device comprise an emissive oxide coating.

6. A heat-to-electrical energy conversion structure comprising at least first and second stage thermionic converter devices, said devices being mutually hermetically sealed, said first stage device comprising refractory metal cathode and anode members having opposed closely spaced active surfaces and a low ionization potential vapor internal atmosphere, the cathode of said first stage device being adapted for being rendered emissive by heat from an external heat source, said second stage device being evacuated and comprising a porous cathode base member containing an emissive material, and a refractory metal anode member having an active surface in closely spaced relation with said active surface of said cathode, and the anode of said first stage device being conjoined in back-to-back direct, heat-transferring relation to the cathode of said second stage device, whereby said emissive material on the active surface of said cathode of said second stage device is adapted for being rendered emissive by heat emanating from the anode of said first stage device.

7. A heat-to-electrical energy conversion structure comprising at least first and second stage thermionic converter devices, said devices being hermetically sealed and each comprising cathode and anode members having opposed closely spaced active surfaces and a low ionization potential internal atmosphere, the anode of each device having a lower work function than its associated cathode, the cathode of said second stage device having a lower work function than the cathode of said first stage device, and the anode of said first stage device and the cathode of said second stage device being conjoined in back-to-back direct, heat-transferring relation, whereby said active surface of said cathode of said second stage device is adapted for being rendered emissive by heat emanating from the anode of said first stage device.

8. A heat-to-electrical energy conversion structure comprising at least first and second stage thermionic converter devices, said first stage device comprising a porous cathode-base member containing an emissive material, and an anode member having an active surface of lower work function than said cathode and being in closely spaced relation thereto, said second stage device comprising cathode and anode members having opposed closely spaced active surfaces with the surface of the anode characterized by a lower work function than that of the cathode, the anode of said first stage device being conjoined in back-to-back, heat-transferring relation to the cathode of said second stage device and the cathode of said second stage device being characterized by a lower work function than the cathode of said first stage device, whereby said active surface of said cathode of said second stage device is adapted for being rendered emissive by heat emanating from the anode of said first stage device.

9. A heat-to-electrical energy conversion structure comprising at least first and second stage thermionic converter devices, said devices each being hermetically sealed and containing a cathode and anode and a low ionization potential vapor atmosphere, the cathode and anode of said first stage device comprising metal members having opposed closely spaced active surfaces, said second stage device comprising a porous cathode base member containing an emissive material and a metal anode member having opposed closely spaced active surfaces, the anode of each device having a lower work function than its associated cathode, the cathode of said second stage device having a lower work function than the cathode of said first stage device, and the anode of said first stage device and the cathode of said second stage device being conjoined in back-to-back, direct, heat-transferring relation, whereby said active surface of said cathode of said second stage device is adapted for being rendered emissive by heat emanating from the anode of said first stage device.

10. A heat-to-electrical energy conversion structure comprising an envelope including a pair of oppositely disposed conductive end caps and at least one intermediate insulative section, a plurality of individual energy conversion devices contained in said envelope in a cooperating cascaded array, each of said devices comprising refractory metal cathode and anode members arranged in closely spaced cooperating relation, the anode and cathode of at least one adjacent pair of said devices being conjoined in back-to-back, direct, heat-transferring relation and supported transversely in said envelope, the cathode of one of said devices being bonded to one of said end caps and the anode of another said devices being bonded to another of said end caps, and the active surfaces of the cathodes of adjacent devices being characterized by different work functions.

11. A heat-to-electrical conversion structure comprising an envelope, at least a pair of opposed electrodes arranged in a cooperating stacked array and predeterminedly spaced by interposed insulative spacing elements, and said envelope comprising portions engaging said electrodes and including portions prestressed and thereby providing internally directed forces urging and maintaining said electrodes in engagement with said spacing elements.

12. A heat-to-electrical conversion structure comprising an envelope, said envelope comprising a pair of metal end caps and an intermediate ceramic cylinder, at least a pair of opposed planar electrodes arranged in cooperating stacked array and predeterminedly spaced by interposed insulative spacing elements, and said end caps being prestressed and interconnected with said electrodes for providing internally directed forces urging and maintaining said elements in engagement with said spacing elements.

13. A heat-to-electrical energy conversion structure comprising an envelope, said envelope comprising a pair of metal end caps and a plurality of intermediate stacked cylinders, and a plurality of converter devices in stacked array and each including a cooperating cathode and anode predeterminedly spaced by interposed insulative spacing elements, an anode and a cathode of adjacent devices being conjoined in back-to-back heat-transferring relation, the outermost cathode and anode of said stacked array of devices being conjoined each with one of said end caps, and means sealed between the opposing ends of said ceramic cylinders and supporting said conjoined cathode and anode transversely in said envelope.

14. A heat-to-electrical energy conversion structure according to claim 13, wherein said means supporting said conjoined anode and cathode comprises also a hermetic divider between portions of said envelope enclosing different converter devices.

15. The method of manufacturing heat-to-electrical energy conversion devices comprising stacking a plurality of cooperating planar electrodes, interposing precisely accurately dimensioned spacing means between the opposed inner surfaces of said elements, positioning the stacked assembly of electrodes in an envelope structure with portions of the envelope structure connecting with the outer surfaces of said electrodes, and establishing stresses in the envelope for effecting forces urging and maintaining the electrodes in contact with said spacing means.

16. The method of manufacturing heat-to-electrical energy conversion devices comprising constructing a first subassembly comprising a metal end cap, a planar electrode joined thereto and a cylindrical insulative side wall sealed to the rim of said end cap and a second subassembly comprising a metal end cap and a planar electrode joined thereto, stacking said subassembly with precisely accurately dimensioned spacing means interposed between said electrodes and positioning the rim of the end cap of said second mentioned subassembly for sealing to the end of said ceramic cylinder of said first-mentioned subassembly with thermally activated sealing means interposed therebetween, and heating the assembly for expanding the envelope elements and effecting a seal, whereby upon cooling said expanded elements tend to contract and induce internal stresses in the elements of said envelope effective for urging and maintaining said electrodes in contact with said spacing means.

17. A thermionic converter device comprising a hermetically sealed envelope, cathode and anode members contained in said envelope in closely spaced cooperating relation, said cathode comprising a porous base member containing an emissive oxide material, and said anode comprising a metal base member having an emissive oxide coating characterized by a lower work function than said cathode.

18. A thermionic converter device comprising a hermetically sealed envelope containing a low ionization potential vapor atmosphere and a cathode and anode in closely spaced cooperating relation, said cathode comprising a porous base member containing an emissive material, and said anode comprising a metal member having an active surface characterized by a lower work function than said cathode member.

References Cited in the file of this patent

UNITED STATES PATENTS

| | | |
|---|---|---|
| 1,712,032 | Donle | May 7, 1929 |
| 2,623,197 | Kalb | Dec. 23, 1952 |
| 2,715,194 | Combee | Aug. 9, 1955 |
| 2,737,607 | Lemmens | Mar. 6, 1956 |
| 2,887,614 | Lafferty | May 19, 1959 |